United States Patent
Ker et al.

(10) Patent No.: US 8,243,404 B2
(45) Date of Patent: Aug. 14, 2012

(54) ESD PROTECTION CIRCUIT WITH MERGED TRIGGERING MECHANISM

(75) Inventors: Ming-Dou Ker, Hsinchu County (TW); Chun-Yu Lin, Hualien (TW); Fu-Yi Tsai, Hsinchu (TW)

(73) Assignee: Faraday Technology Corp., Science-Based Industrial Park, Hsin-Chu (TW)

( * ) Notice: Subject to any disclaimer, the term of this patent is extended or adjusted under 35 U.S.C. 154(b) by 459 days.

(21) Appl. No.: 12/543,468

(22) Filed: Aug. 18, 2009

(65) Prior Publication Data
US 2011/0043953 A1 Feb. 24, 2011

(51) Int. Cl.
*H02H 3/22* (2006.01)
(52) U.S. Cl. .......................... 361/56; 361/111
(58) Field of Classification Search ............. 361/56
See application file for complete search history.

(56) References Cited

U.S. PATENT DOCUMENTS

| 2003/0076636 A1* | 4/2003 | Ker et al. ............. 361/56 |
| 2009/0180224 A1* | 7/2009 | Ker et al. ............. 361/56 |

* cited by examiner

*Primary Examiner* — Rexford Barnie
*Assistant Examiner* — Tien Mai
(74) *Attorney, Agent, or Firm* — Winston Hsu; Scott Margo

(57) ABSTRACT

An ESD protection circuit has a merged triggering mechanism. The ESD protection circuit comprises: an ESD detection circuit, for detecting an ESD voltage to generate a control signal; a first type ESD protection device, for outputting a first trigger current; a second type ESD protection device, for receiving a second trigger current; and a trigger circuit, for constituting a conductive path according to the control signal, such that the trigger circuit can receive the first trigger current from the first type ESD protection device and outputs the second trigger current to the second type ESD protection device.

15 Claims, 6 Drawing Sheets

ESD PROTECTION CIRCUIT WITH MERGED TRIGGERING MECHANISM

BACKGROUND OF THE INVENTION

1. Field of the Invention

The present invention relates to an ESD (Electrostatic Discharge) protection circuit, and more particularly relates to an ESD protection circuit that can save area and prevent leakage current.

2. Description of the Prior Art

FIG. 1 illustrates a prior art ESD protection circuit 100. As shown in FIG. 1, the prior art ESD protection circuit 100 can include ESD protection devices 101, 103, trigger circuits 107, 109 and an ESD detection circuit 111. The object of such structure is to avoid the ESD voltage directly entering the internal circuit 105 via the input/output pad 113 to damage the internal circuit 105, when the ESD voltage is generated. The operation of the ESD protection circuit 100 can be summarized as below: the ESD detection circuit 111 generates a control signal to control the triggering circuits 107 and 109, when the ESD detection circuit 111 detects the ESD voltage is generated. Then, the trigger circuits 107 and 109 will trigger the ESD protection devices 101, 103, such that the ESD protection devices 101, 103 can guide out the ESD current, thereby the internal circuit 105 can be protected.

However, the trigger circuit 107 will occupy a large area, and a trigger circuit must be provided for each ESD protection device in this kind of structure. Accordingly, the trigger circuit 109 will also occupy a large area. Additionally, in order to decrease the complexity and the cost of the chip, devices with thin oxide layers are always utilized to implement the ESD detection circuit and the trigger circuit. In this situation, leakage current $I_{LEA}$ may occur and flow along the path shown in FIG. 1 to the voltage $V_{ss}$. Also, the leakage current will cause extra power consumption when the internal circuit 105 operates normally.

SUMMARY OF THE INVENTION

One objective of the present invention is to provide an ESD protection circuit that can save circuit area (e.g., circuit layout area).

Another objective of the present invention is to provide an ESD protection circuit that can decrease leakage current.

One embodiment of the present invention discloses an ESD detection circuit with a merged triggering mechanism. The ESD detection circuit comprises: an ESD detection circuit, for detecting an ESD voltage to generate a control signal; a first type ESD protection device, for outputting a first trigger current; a second type ESD protection device, for receiving a second trigger current; and a trigger circuit, for constituting a conductive path according to the control signal, such that the trigger circuit can receive the first trigger current from the first type ESD protection device and outputs the second trigger current to the second type ESD protection device.

The ESD protection circuit can further include a first switch and a second switch. The first switch determines if the first type ESD protection device and the second type ESD protection device are conductive or not according to the control signal. The second switch determines if the first voltage level, the second voltage level and the ESD detection circuit form a conductive path according to the control signal.

Via above-mentioned embodiments, the ESD protection circuit according to the embodiment of the present invention can save trigger circuit area, and provides the structure for decreasing leakage current. Therefore the problem of the prior art ESD protection circuit can be improved.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
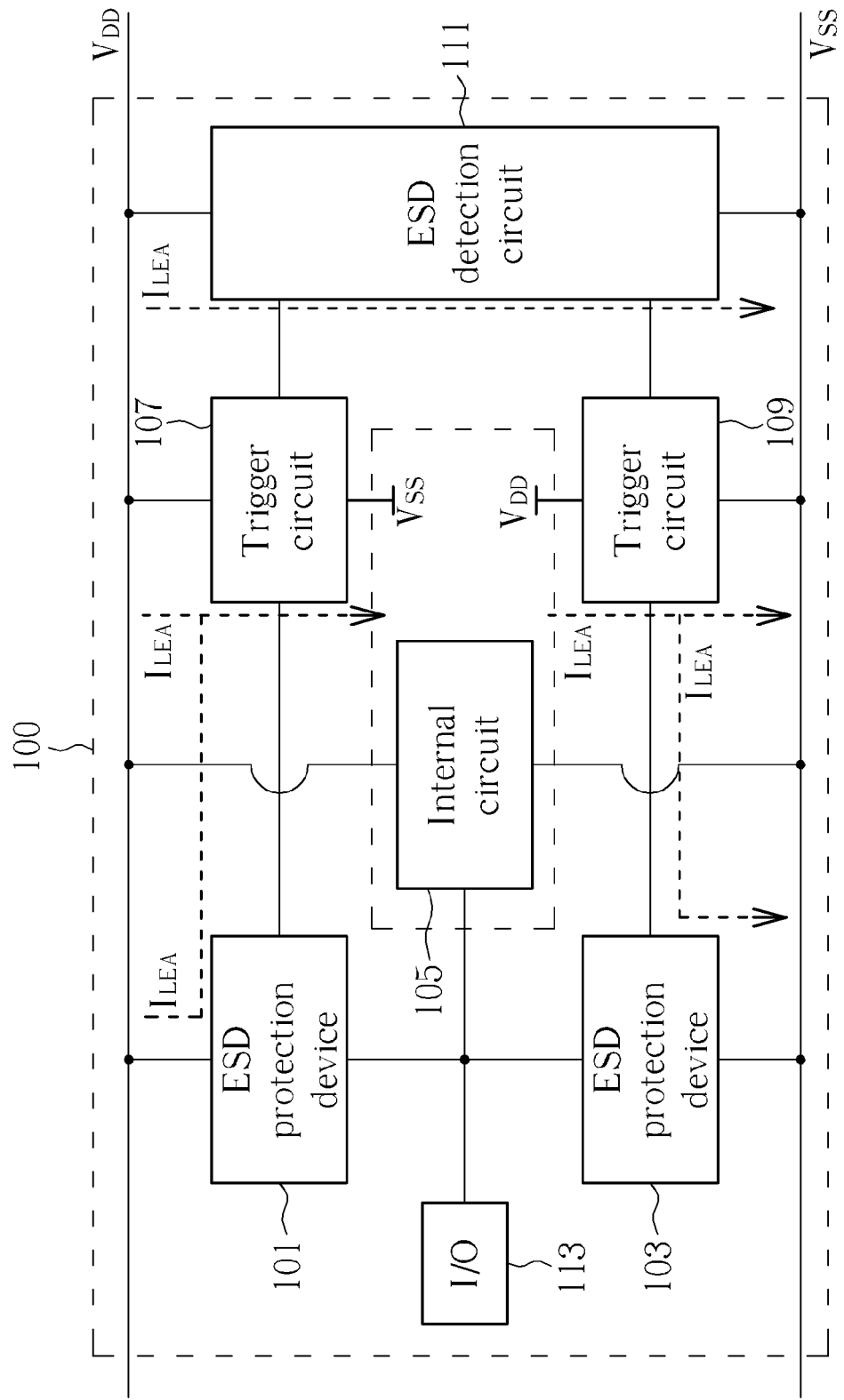
FIG. 1 is a prior art ESD protection circuit.
Figure 2:
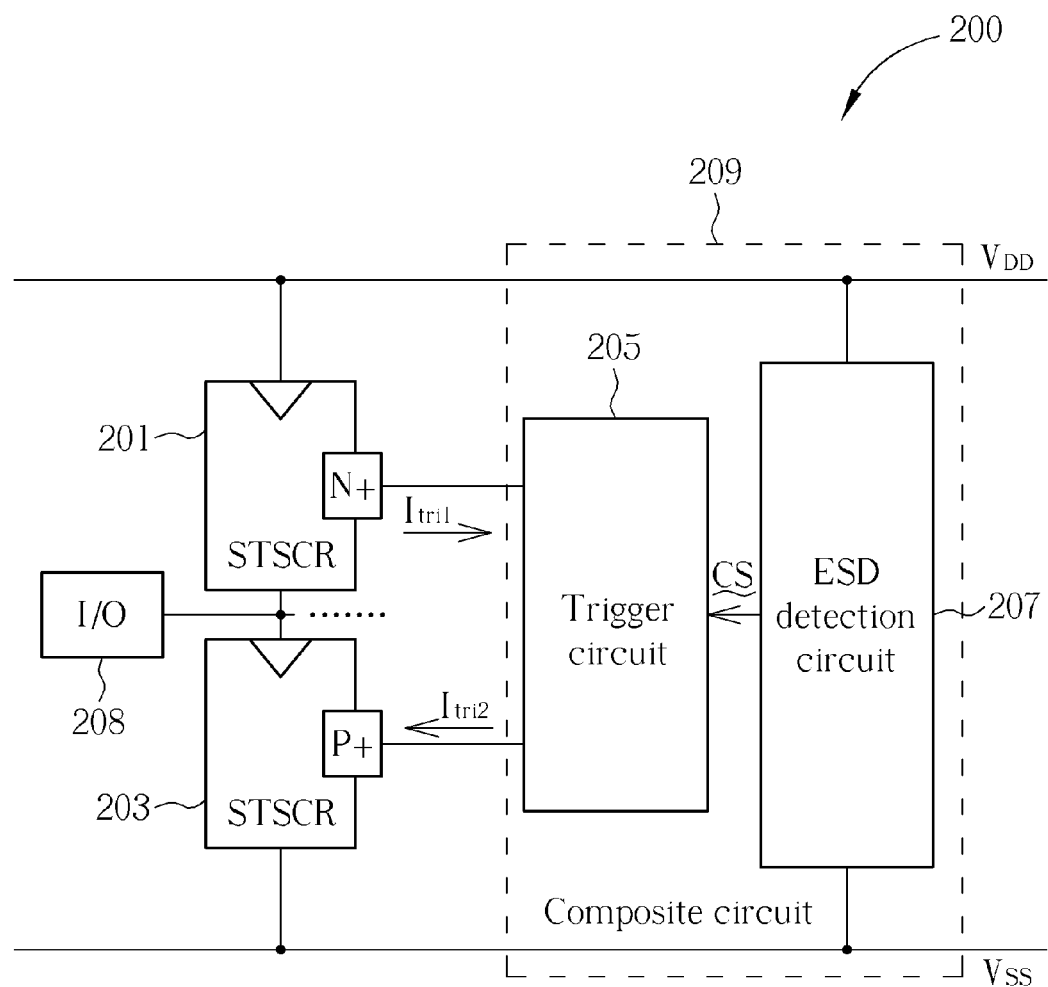
FIG. 2 is an ESD protection circuit that can save trigger circuit area according to one embodiment of the present invention.

FIG. 2 is an ESD protection circuit 200 that can save trigger circuit area according to one embodiment of the present invention. In this embodiment, an N type SCR and a P type SCR are utilized to implement ESD protection devices, but this embodiment does not mean to limit the scope of the present application. As shown in FIG. 2, the ESD protection circuit 200 includes an N type SCR 201, a P type SCR 203, a trigger circuit 205 and an ESD detection circuit 207. Please note, some internal circuits disclosed in FIG. 1, which connect to an input/output pad 208, are omitted for brevity. The ESD detection circuit 207 is utilized to detect an ESD voltage to generate a corresponding control signal CS. The N type SCR 201 is utilized to output a first trigger current $I_{tri1}$; the N type SCR 201 conducts a conductive path between two terminals (i.e. between the supplying voltage level $V_{DD}$ and the input/output pad 208) according to the triggering of the first trigger current $I_{tri1}$. The P type SCR 203 is utilized to receive a second trigger current $I_{tri2}$; the P type SCR 203 conducts a conductive path between two terminals (i.e. between the ground voltage level $V_{SS}$ and the input/output pad 208) according to the triggering of the second trigger current $I_{tri2}$. The trigger circuit 205 forms a conductive path according to the control signal CS, to receive the first trigger current $I_{tri1}$ from the N type SCR 201, and to output the second trigger current $I_{tri2}$ to the P type SCR 203.

In one embodiment, the first trigger current $I_{tri1}$ and the second trigger current $I_{tri2}$ include the same current value. In other words, in one embodiment of the present invention, the trigger circuit 205 can transmit the trigger current of the SCR 201 to another SCR 203, such that a single trigger circuit 205 can trigger more than one ESD protection devices. Such mechanism is called the merged triggering mechanism and can save the trigger circuit area. The current values of the first trigger current $I_{tri1}$ and the second trigger current $I_{tri2}$ can be adjusted according to different required currents of the SCR. Basically, the SCRs 201 and 203 can have different threshold conductive currents. However, the trigger circuit 205 can trigger both, once the SCR 201 can drain current large enough and transmits it to a SCR 203 (for example, a current larger than the threshold currents of the SCRs 201 and 203). Also, in the block diagram shown in FIG. 2, the trigger circuit 205 is not coupled to the supplying voltage level $V_{DD}$ and the ground voltage level $V_{SS}$, but the trigger circuit 205 can be coupled to the supplying voltage $V_{DD}$ and the ground voltage level $V_{SS}$. Besides, the trigger circuit 205 and the ESD detection circuit 207 can be merged to a composite circuit 209.

Figure 3:
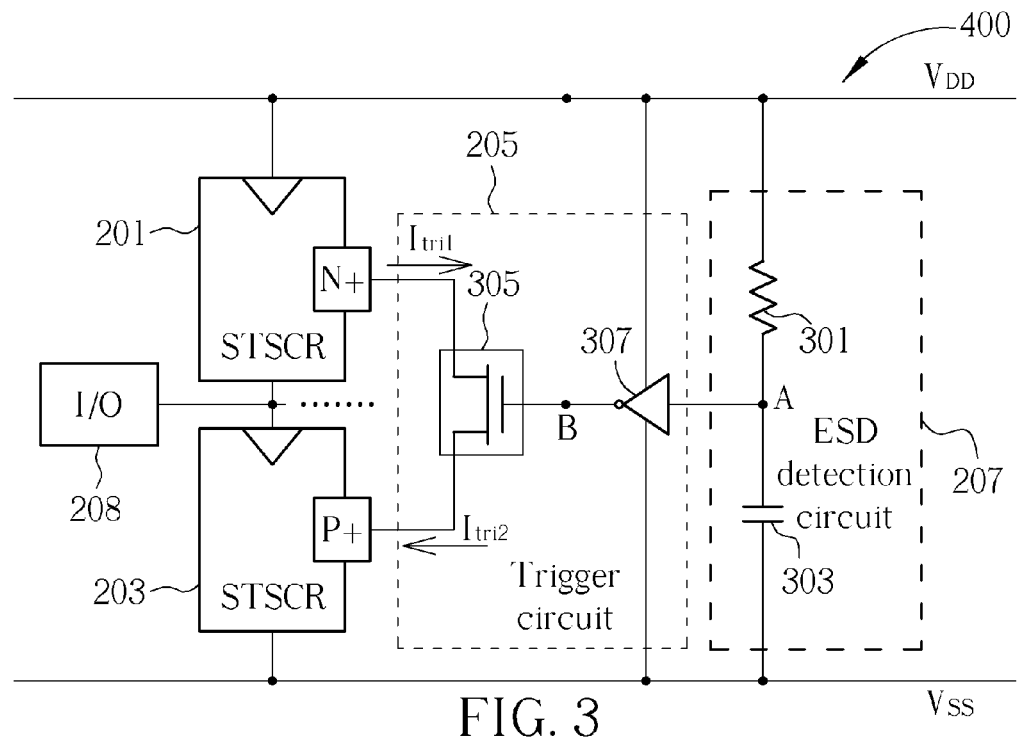
FIG. 3 and FIG. 4 respectively illustrate one embodiment of detail structures of the ESD protection circuit shown in FIG. 2.
Figure 4:
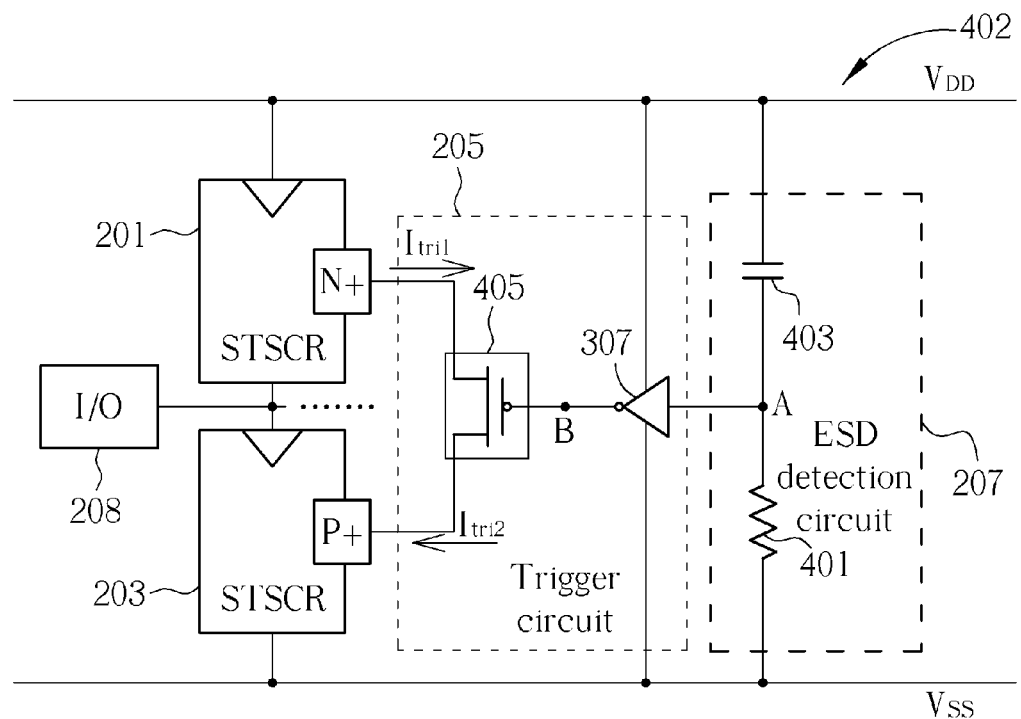

FIG. 3 and FIG. 4 respectively illustrate one embodiment of detail structures of the ESD protection circuit 200 shown in FIG. 2. In the embodiment shown of FIG. 3, the ESD detection circuit 207 includes a resistor 301 and a capacitor 303. The trigger circuit 205 shown in FIG. 3 includes a first NMOS 305 and an inverter 307. The first NMOS 305 includes a drain terminal coupled to the N type SCR 201 and a source terminal couple to the P type SCR 203. The inverter 307 includes an output terminal coupled to a gate terminal of the first NMOS 305, and an input terminal coupled to a second terminal of the resistor 301.

The supplying voltage $V_{DD}$ and the ground voltage level $V_{SS}$ are utilized as the supplying voltages of the inverter 307. The supplying voltage $V_{DD}$ charges the capacitor 303 in a normal operation, such that the voltage level at A is HIGH and the voltage level at B is LOW, and the first NMOS 305 is non-conductive. Oppositely, when an ESD voltage occurs, since the capacitor 303 can not be rapidly charged, the voltage level at A is LOW and the voltage level at B is HIGH, and the first NMOS 305 will be conductive. The N type SCR 201 and the P type SCR 203 will respectively receive negative current and positive current, and are triggered to be conductive. The triggered conductive path can release the ESD current, such that the internal circuit can be prevented from being damaged by the ESD current.

In FIG. 4, the ESD detection circuit 207 also has a resistor 401 and a capacitor 403, and the resistor 401, the capacitor 403 have contrary locations of the resistor 301 and the capacitor 303 shown in FIG. 3. Besides, the first NMOS 305 in FIG. 3 is replaced with the first PMOS 405. In the embodiment shown in FIG. 4, the supplying voltage $V_{DD}$ will charge the capacitor 403, such that the voltage level at A is LOW, the voltage level at B is HIGH, and the first PMOS 405 is non-conductive. Oppositely, when an ESD voltage occurs, the voltage level at A is HIGH, the voltage level at B is LOW, and the first PMOS 405 will be conductive. The N type SCR 201 and the P type SCR 203 will respectively receive negative current and positive current and are triggered to be conductive. The triggered conductive path can release the ESD current, such that the internal circuit can be prevented from damage of the ESD current.

Figure 5:
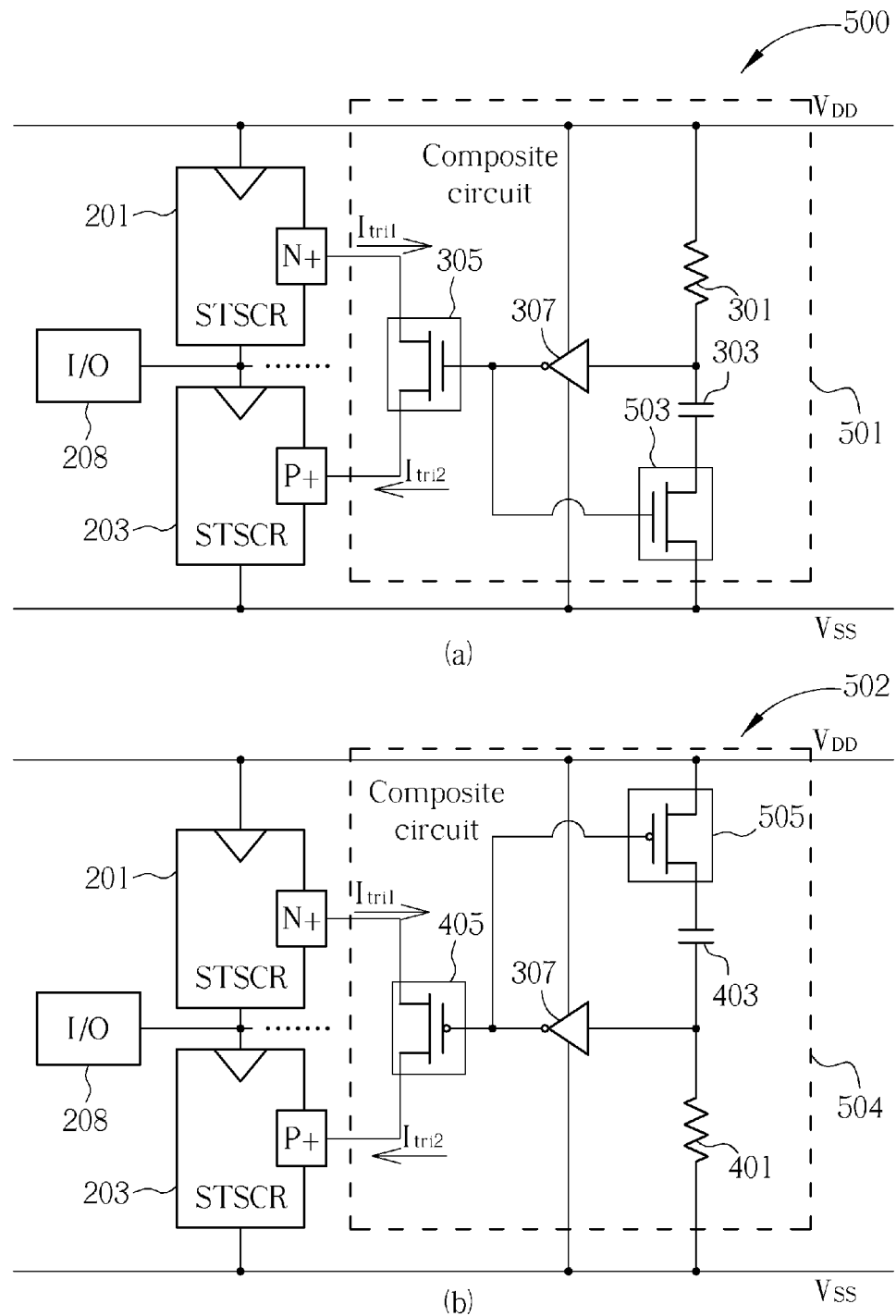
FIGS. 5-7 illustrate detail structures of the ESD protection circuit that can prevent leakage current according the embodiment of the present invention.
Figure 6:
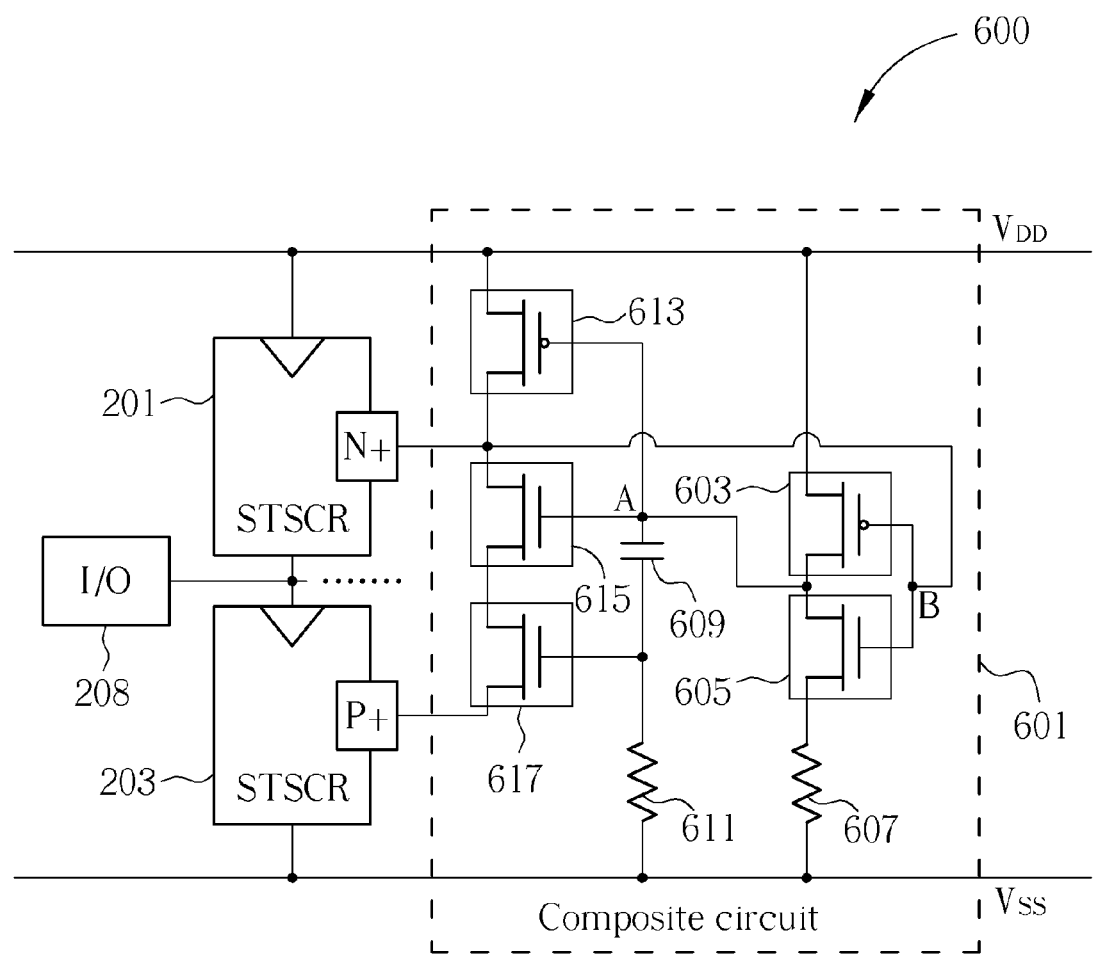
Figure 7:
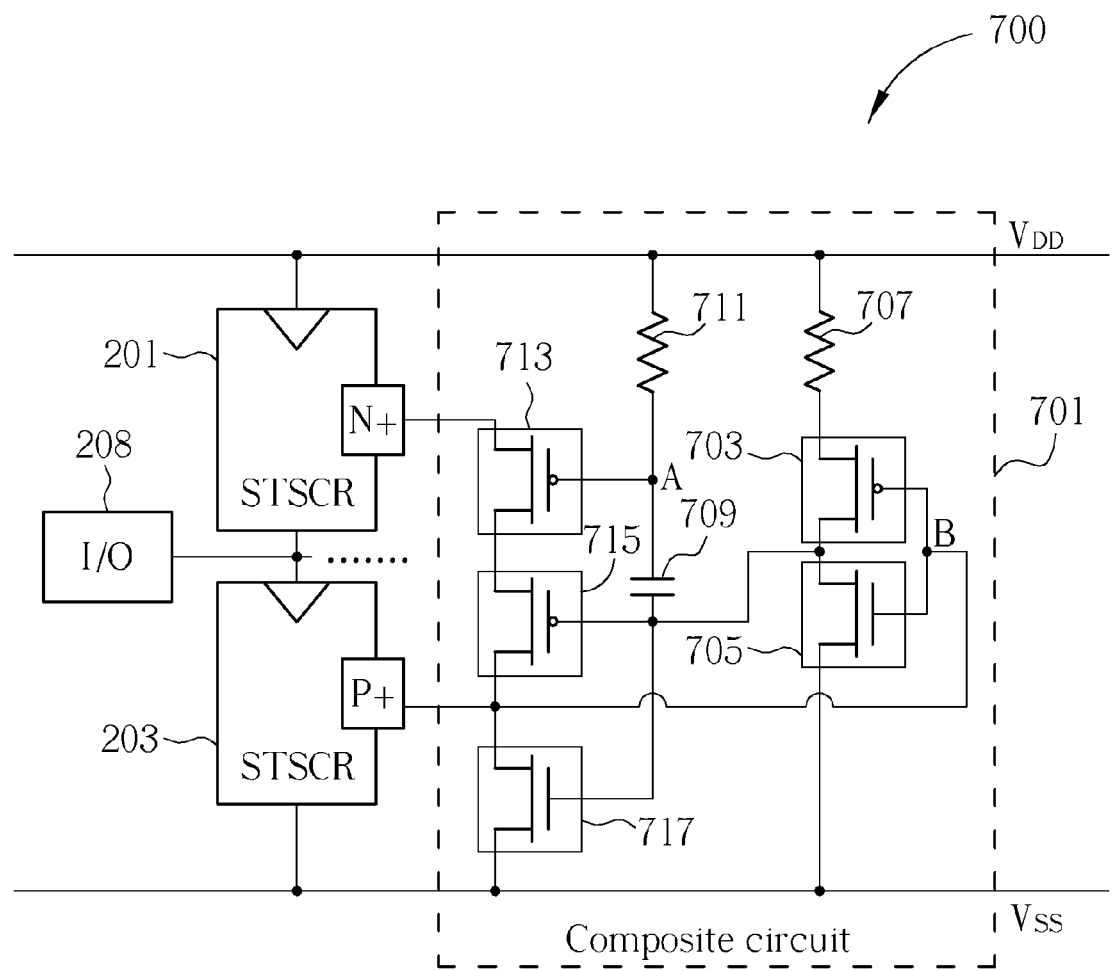

FIGS. 5-7 illustrate detail structures of the ESD protection circuit that can prevent leakage current according the embodiment of the present invention. Comparing with the embodiments shown in FIG. 2 to FIG. 4, the embodiments shown in FIG. 5 to FIG. 7 further includes a structure that can prevent leakage current, besides the structure that can decrease circuit area illustrated in FIG. 2 to FIG. 4. Also, in FIG. 5 to FIG. 7, the ESD circuit and the trigger circuit are integrated to a composite circuit, which has the functions of both the ESD detection circuit and the trigger circuit. Also, the composite circuit further includes the structure for preventing leakage current. Comparing the ESD protection circuit 500 in FIG. 5(a) with which in FIG. 3, the composite circuit 501 further includes a second NMOS 503 besides the resistor 301, the capacitor 303, the first NMOS 305 and the inverter 307. Accordingly, the second NMOS 503 is also non-conductive when the first NMOS 305 is non-conductive, such that the generating of the leakage current can be avoided. For example, in a normal operation, the non-conductive second NMOS 503 will cut the leakage path from the capacitor 303 to the ground voltage $V_{SS}$, to avoid the generating of leakage current and the power consumption from which. Similarly, comparing the ESD protection circuit 500 shown in FIG. 5(b) with which in FIG. 4, the composite circuit 504 further includes a second PMOS 505. The second PMOS 505 is also non-conductive when the first PMOS 405 is non-conductive, such that the occurrence of the leakage current can also be prevented.

The concept of the embodiments shown in FIG. 5(a) and FIG. 5(b) can be shown as follows: the ESD protection circuit include a first switch (the first NMOS 305 or the first PMOS 405) and a second switch (the second NMOS 503 or the second PMOS 505. The first switch is controlled by the control signal to conduct the first type ESD protection device (the N type SCR 201) and the second type ESD protection device (the P type SCR 203). The second switch is controlled by the control signal to control a conductive path formed by the first voltage level such as the supplying voltage $V_{DD}$, the second voltage level such as the ground voltage level $V_{SS}$ and the ESD detection circuit (e.g., a combination of the capacitor 303 and the resistor 301).

FIG. 6 to FIG. 7 illustrate the detail structures of the ESD protection circuit that can prevent leakage current, according to one embodiment of the present invention. The common concept of the ESD protection circuits 600 and 700 is to decrease the voltage across the capacitor of the composite circuit to improve disadvantage of leakage current. In the ESD protection circuit 600, the composite circuit 601 includes a first PMOS 603, a first NMOS 605, a first resistor 607, a capacitor 609, a second resistor 611, a second PMOS 613, a second NMOS 615 and a third NMOS 617. The PMOS 603 includes a source terminal coupled to the supplying voltage VDD, a gate terminal coupled to the N type SCR 201, and a drain terminal coupled to a drain terminal of the first NMOS 605. The first resistor 607 includes a first terminal coupled to a source terminal of the first NMOS 605, and a second terminal coupled to the ground voltage level $V_{SS}$. The second PMOS 613 includes a source terminal coupled to the supplying voltage $V_{DD}$, a gate terminal coupled to a drain terminal of the first PMOS 603 and a drain terminal coupled to the N type SCR 201. The second NMOS 615 has a drain terminal coupled to a drain terminal of the second PMOS 613, and a gate terminal coupled to a drain terminal of the first PMOS 603. The capacitor 609 has a first terminal coupled to a gate terminal of gate terminal of the second NMOS 615. The third NMOS 617 includes a drain terminal coupled to a source terminal of the second NMOS 615, a gate terminal coupled to a second terminal of the capacitor, and a source terminal coupled to the P type SCR 203. The second resistor 611 includes a first terminal coupled to a gate terminal of the third NMOS 617, and a second terminal coupled to the ground voltage level $V_{SS}$.

The operation of the ESD protection circuit 600 shown in FIG. 6 can be summarized as follows: In a normal operation, the second PMOS 613 is conductive and makes the voltage level at B HIGH. Also, the voltage level at A is pulled to be LOW via a feedback mechanism. By this way, the voltage across the capacitor 609 keeps decreasing, and the second NMOS 615 and the third NMOS 617 can be effectively turned off. Accordingly, the leakage current path will be cut and the situation of the leakage current decreases.

The operation of the ESD protection circuit 700 is similar with which of the ESD protection circuit 600. However, the ESD protection circuit 700 utilizes two PMOSs and an NMOS to replace with two NMOSs and a PMOS of the ESD protection circuit 600. Also, the locations of the resistor and the capacitor in the composite circuit in the ESD protection circuit 700 are different from which of the ESD protection circuit 600. The composite circuit 701 in the ESD detection circuit 700 comprises: a first PMOS 703, a first NMOS 705, a first resistor 707, a capacitor 709, a second resistor 711, a second PMOS 713, a third PMOS 715 and a second NMOS 717. The first NMOS 705 has a gate terminal coupled to the P type SCR 203, a drain terminal coupled to a drain terminal of the first PMOS 703, and a source terminal coupled to the ground voltage level $V_{SS}$. The first resistor 707 includes a first terminal coupled to the supplying voltage $V_{DD}$ and a second terminal coupled to a source terminal of the first PMOS 703.

The second resistor 711 has a first terminal coupled to the first voltage level $V_{DD}$. The second PMOS 713 has a source terminal coupled to the N type SCR 201, and a gate terminal coupled to a second terminal of the second resistor 711. The capacitor 709 has a first terminal coupled to the gate terminal of the second PMOS 713, and a second terminal coupled to the drain terminal of the first NMOS 705. The third PMOS 715 has a source terminal coupled to a drain terminal of the second PMOS 713, a gate terminal coupled to the second terminal of the capacitor 709, and a drain terminal coupled to the P type SCR 203. The second NMOS 717 has a drain terminal coupled to the P type SCR 203, a gate terminal coupled to the second terminal of the capacitor 709, and a source terminal coupled to the ground voltage level $V_{SS}$.

The operation of the ESD protection circuit 700 can be summarized as follows: In the normal operation, the second NMOS 717 is conductive to make the voltage level at B LOW. Also, according to a feedback mechanism, the voltage level at a second terminal of the capacitor 709, which is coupled to a drain terminal of the first NMOS 705, will be pulled to HIGH. By this way, the voltage across the capacitor 709 decreases, and the third PMOS 715 and the second PMOS 713 can be effectively closed (turned off). Accordingly, the leakage current path will be cut and the situation of the leakage current decreases.

Via above-mentioned embodiments, the ESD protection circuit according to the embodiment of the present invention can save trigger circuit area, and provides the structure for decreasing leakage current. Therefore the problem of the prior art ESD protection circuit can be improved.

Those skilled in the art will readily observe that numerous modifications and alterations of the device and method may be made while retaining the teachings of the invention.

What is claimed is:

1. An ESD protection circuit with a merged triggering mechanism, comprising:
   a ESD detection circuit, coupled to a first conductive line receiving a first voltage level and a second conductive line receiving a second voltage level, for detecting an ESD voltage from the first conductive line or the second conductive line to generate a control signal, wherein the first voltage level is higher than the second voltage level;
   a first type ESD protection device, for outputting a first trigger current;
   a second type ESD protection device, for receiving a second trigger current; and
   a trigger circuit coupled between the first voltage level and the second voltage level, for constituting a conductive path according to the control signal, such that the trigger circuit receives the first trigger current from the first type ESD protection device and output the second trigger current to the second type ESD protection device;
   an input/output pad;
   wherein the ESD detection circuit is not directly connected to the input/output pad, and the trigger circuit comprises a first switch and a second switch, wherein the first switch is controlled by the control signal to conduct the first type ESD protection device and the second type ESD protection device, wherein the second switch is controlled by the control signal to control a conductive path formed by the first voltage level, the second voltage level and the ESD detection circuit.

2. The ESD protection circuit of claim 1, wherein the first type ESD protection device is an N type SCR, and the second type ESD protection device is a P type SCR.

3. The ESD protection circuit of claim 1, wherein the first trigger current has the same value of the second trigger current.

4. The ESD protection circuit of claim 1, wherein the ESD detection circuit comprises:
   a resistor, comprising a first terminal coupled to the first voltage level;
   a capacitor, comprising a first terminal coupled to a second terminal of the resistor, and a second terminal coupled to the second voltage level;
   wherein the trigger circuit further comprises:
   an inverter, having an output terminal coupled to a gate terminal of the first switch, and having an input terminal coupled to the second terminal of the resistor of the ESD detection circuit,
   wherein the first switch is a first NMOS, the first NMOS comprising a drain terminal coupled to the first type ESD protection device, and a source terminal coupled to the second type ESD protection device, and
   wherein the first voltage level and the second voltage level are utilized for supplying voltages of the inverter.

5. The ESD protection circuit of claim 4, wherein the second switch is a second NMOS having a drain terminal coupled to the second terminal of the capacitor, a source terminal coupled to the second voltage level, and a gate terminal coupled to the gate terminal of the first NMOS and the output terminal of the inverter.

6. The ESD protection circuit of claim 1, wherein the ESD detection circuit comprises:
   a capacitor, having a first terminal coupled to the first voltage level; and
   a resistor, having a first terminal coupled to a second terminal of the capacitor, and a second terminal coupled to the second voltage level;
   wherein the trigger circuit further comprises:
   an inverter, having an output terminal coupled to a gate terminal of the first switch, and having an input terminal coupled to the second terminal of the capacitor of the ESD detection circuit,
   wherein the first switch is a first PMOS, the first PMOS having a source terminal coupled to the first type ESD protection device, and a drain terminal coupled to the second type ESD protection device, and
   wherein the first voltage level and the second voltage level are utilized for supplying voltages of the inverter.

7. The ESD protection circuit of claim 6, wherein the second switch is a second PMOS having a drain terminal coupled to the first terminal of the capacitor, a source terminal coupled to the first voltage level, and a gate terminal coupled to the gate terminal of the first PMOS and the output terminal of the inverter.

8. An ESD protection circuit with a merged triggering mechanism, comprising:
   a ESD detection circuit, coupled to a first conductive line receiving a first voltage level and a second conductive line receiving a second voltage level, for detecting an ESD voltage from the first conductive line or the second conductive line to generate a control signal;
   a first type ESD protection device, for outputting a first trigger current;
   a second type ESD protection device, for receiving a second trigger current, wherein the first trigger current has the same value of the second trigger current; and
   a trigger circuit coupled between the first voltage level and the second voltage level, for constituting a conductive path according to the control signal, such that the trigger circuit receives the first trigger current from the first type ESD protection device and outputs the second trigger current to the second type ESD protection device;
   wherein the trigger circuit comprises a first switch and a second switch, wherein the first switch is controlled by the control signal to conduct the first type ESD protection device and the second type ESD protection device, where the second switch is controlled by the control signal to control a conductive path formed by the first voltage level, the second voltage level and the ESD detection circuit.

9. An ESD protection circuit with a merged triggering mechanism, comprising:
   a ESD detection circuit, for detecting a ESD voltage to generate a control signal;
   a first type ESD protection device, for outputting a first trigger current;
   a second type ESD protection device, for receiving a second trigger current; and
   a trigger circuit, for constituting a conductive path according to the control signal, such that the trigger circuit receives the first trigger current from the first type ESD protection device and outputs the second trigger current to the second type ESD protection device;
   wherein the ESD detection circuit and the trigger circuit are coupled between a first voltage level and a second voltage level, and the first voltage level is higher than the second voltage level;
   where the trigger circuit comprises a first switch and a second switch, wherein the first switch is controlled by the control signal to conduct the first type ESD protection device and the second type ESD protection device, where the second switch is controlled by the control signal to control a conductive path formed by the first voltage level, the second voltage level and the ESD detection circuit.

10. An ESD protection circuit with a merged triggering mechanism, comprising:
    a ESD detection circuit, for detecting a ESD voltage to generate a control signal;
    a first type ESD protection device, for outputting a first trigger current;
    a second type ESD protection device, for receiving a second trigger current; and
    a trigger circuit, for constituting a conductive path according to the control signal, such that the trigger circuit receives the first trigger current from the first type ESD protection device and outputs the second trigger current to the second type ESD protection device;
    wherein the ESD detection circuit and the trigger circuit are coupled between a first voltage level and a second voltage level, and the first voltage level is higher than the second voltage level;
    where the ESD detection circuit comprises:
      a resistor, comprising a first terminal coupled to the first voltage level;
      a capacitor, comprising a first terminal coupled to a second terminal of the resistor, and a second terminal coupled to the second voltage level;
    wherein the trigger circuit comprises:
      a first NMOS, comprising a drain terminal coupled to the first type ESD protection device, and a source terminal coupled to the second type ESD protection device; and
      an inverter, having a output terminal coupled to a gate terminal of the first NMOS, and having an input terminal coupled to the second terminal of the resistor of the ESD detection circuit;
    wherein the first voltage level and the second voltage level are utilized for supplying voltages of the inverter.

11. The ESD protection circuit of claim 10, further comprising a second NMOS having a drain terminal coupled to the second terminal of the capacitor, a source terminal coupled to the second voltage level, and a gate terminal coupled to the gate terminal of the first NMOS and the output terminal of the inverter.

12. An ESD protection circuit with a merged triggering mechanism, comprising:
    a ESD detection circuit, for detecting a ESD voltage to generate a control signal;
    a first type ESD protection device, for outputting a first trigger current;
    a second type ESD protection device, for receiving a second trigger current; and
    a trigger circuit, for constituting a conductive path according to the control signal, such that the trigger circuit receives the first trigger current from the first type ESD protection device and outputs the second trigger current to the second type ESD protection device;
    wherein the ESD detection circuit and the trigger circuit are coupled between a first voltage level and a second voltage level, and the first voltage level is higher than the second voltage level;
    where the ESD detection circuit comprises:
      a capacitor, having a first terminal coupled to the first voltage level; and
      a resistor, having a first terminal coupled to a second terminal of the capacitor, and a second terminal coupled to the second voltage level;
    wherein the trigger circuit comprises:
      a first PMOS, having a source terminal coupled to the first type ESD protection device, and a drain terminal coupled to the second type ESD protection device; and
      an inverter, having a output terminal coupled to a gate terminal of the first PMOS, and having an input terminal coupled to the second terminal of the capacitor of the ESD detection circuit;
    wherein the first voltage level and the second voltage level are utilized for supplying voltages of the inverter.

13. The ESD protection circuit of claim 12, further comprising a second PMOS, having a drain terminal coupled to the first terminal of the capacitor, a source terminal coupled to the first voltage level, and a gate terminal coupled to the gate terminal of the first PMOS and the output terminal of the inverter.

14. An ESD protection circuit with a merged triggering mechanism, comprising:
- a ESD detection circuit, for detecting a ESD voltage to generate a control signal;
- a first type ESD protection device, for outputting a first trigger current;
- a second type ESD protection device, for receiving a second trigger current; and
- a trigger circuit, for constituting a conductive path according to the control signal, such that the trigger circuit receives the first trigger current from the first type ESD protection device and outputs the second trigger current to the second type ESD protection device;
- wherein the trigger circuit is integrated to the ESD detection circuit to form a composite circuit, and the composite circuit comprises:
- a first PMOS, having a source terminal coupled to the first voltage level, and a gate terminal coupled to the first type ESD protection device;
- a first NMOS, having a gate terminal coupled to the first type ESD protection device, and a drain terminal coupled to a drain terminal of the first PMOS;
- a first resistor, having a terminal coupled to the first NMOS and a second terminal coupled to the second voltage level;
- a second PMOS, having a source terminal coupled to the first voltage level and a gate terminal coupled to the drain terminal of the first PMOS, and a drain terminal coupled to the first type ESD protection device;
- a second NMOS, having a drain terminal coupled to the drain terminal of the second PMOS and a gate terminal coupled to the drain terminal of the first PMOS;
- a capacitor, having a first terminal coupled to the gate terminal of the second NMOS;
- a third NMOS, having a drain terminal coupled to a source terminal of the second NMOS, a gate terminal coupled to a second terminal of the capacitor, and a source terminal coupled to the second type ESD protection device; and
- a second resistor, having a first terminal coupled to the gate terminal of the third NMOS, and a second terminal coupled to the second voltage level.

15. An ESD protection circuit with a merged triggering mechanism, comprising:
- a ESD detection circuit, for detecting a ESD voltage to generate a control signal;
- a first type ESD protection device, for outputting a first trigger current;
- a second type ESD protection device, for receiving a second trigger current; and
- a trigger circuit, for constituting a conductive path according to the control signal, such that the trigger circuit receives the first trigger current from the first type ESD protection device and outputs the second trigger current to the second type ESD protection device;
- wherein the trigger circuit is integrated to the ESD detection circuit to form a composite circuit, and the composite circuit comprises:
- a first PMOS, having a gate terminal coupled to the second type ESD protection device;
- a first NMOS, having a gate terminal coupled to the second type ESD protection device, and a drain terminal coupled to a drain terminal of the first PMOS;
- a first resistor, having a first terminal coupled to the first voltage level and a second terminal coupled to a source terminal of the first PMOS;
- a second resistor, having a first terminal coupled to the first voltage level;
- a second PMOS, having a source terminal coupled to the first type ESD protection device, and a gate terminal coupled to a second terminal of the second resistor;
- a capacitor, having a first terminal coupled to the gate terminal of the second PMOS, and a second terminal coupled to the drain terminal of the first NMOS;
- a third PMOS, having a source terminal coupled to a drain terminal of the second PMOS, a gate terminal coupled to the second terminal of the capacitor, and a drain terminal coupled to the second type ESD protection device;
- a second NMOS, having a drain terminal coupled to the second type ESD protection device, a gate terminal coupled to the second terminal of the capacitor, and a source terminal coupled to the second voltage level.

* * * * *